United States Patent [19]

Ganguli

[11] Patent Number: 4,478,705
[45] Date of Patent: Oct. 23, 1984

[54] HYDROCONVERSION PROCESS FOR HYDROCARBON LIQUIDS USING SUPERCRITICAL VAPOR EXTRACTION OF LIQUID FRACTIONS

[75] Inventor: Partha S. Ganguli, Lawrenceville, N.J.

[73] Assignee: HRI, Inc., Gibbsboro, N.J.

[21] Appl. No.: 468,108

[22] Filed: Feb. 22, 1983

[51] Int. Cl.³ ............................................. C10G 65/10
[52] U.S. Cl. ...................................... 208/59; 208/96; 208/102
[58] Field of Search .................... 208/59, 108, 96, 309, 208/102, 48 R

[56] References Cited

U.S. PATENT DOCUMENTS

| 2,847,353 | 8/1958 | Beavon | 208/102 X |
| 2,875,149 | 2/1959 | Beavon | 208/73 |
| 2,943,050 | 6/1960 | Beavon | 208/309 |
| 3,507,777 | 4/1970 | Hemminger | 208/86 |
| 4,354,922 | 10/1982 | Derbyshire et al. | 208/68 |
| 4,358,365 | 11/1982 | Hutchings et al. | 208/96 |

Primary Examiner—Delbert E. Gantz
Assistant Examiner—O. Chaudhuri
Attorney, Agent, or Firm—Fred A. Wilson

[57] ABSTRACT

A process for high hydroconversion of heavy hydrocarbon liquid feedstocks such as petroleum residua containing at least about 50 V % material boiling above 975° F. to produce lower boiling hydrocarbon liquid and gas products, wherein heavy RCR materials and metals compounds are removed in-situ from the reactor effluent liquid by solvent vapor extraction using a process-derived solvent vapor at supercritical conditions. In the process, the feedstock is catalytically hydroconverted at 780°–860° F. temperature, and the resulting liquid fraction is contacted with a process-derived solvent vapor fraction having a normal boiling range of 250°–400° F. and heated to supercritical temperature to dissolve and extract substantially all the hydrocarbon liquid fractions, and separate heavy RCR materials and the metals compounds contained therein. The resulting supercritical solvent vapor with dissolved liquid fraction is pressure-reduced and distilled to recover the needed solvent fraction and to provide a hydrocarbon liquid fraction product. The hydrogenation step preferably uses an ebullated catalytic bed. Also, if desired, the supercritical solvent vapor extraction step can be used intermediate two hydroconversion reaction zones connected in series to produce additional desired lower boiling desulfurized hydrocarbon liquid fraction products.

7 Claims, 3 Drawing Figures

HYDROCONVERSION PROCESS FOR HYDROCARBON LIQUIDS USING SUPERCRITICAL VAPOR EXTRACTION OF LIQUID FRACTIONS

BACKGROUND OF INVENTION

This invention pertains to a catalytic hydroconversion process for heavy hydrocarbon liquid feedstocks to produce lower boiling hydrocarbon liquid and gas products. It pertains particularly to such a hydroconversion process in which supercritical solvent vapor extraction is used in-situ to dissolve the reactor liquid fraction and remove Ramsbottom carbon residue (RCR) and metals containing compounds to avoid their precipitation in downstream processing equipment and achieve high conversion.

In hydroconversion processes such as for petroleum residua feeds for producing lower boiling liquid products, it is usually necessary to remove a substantial portion of RCR-containing and metals-containing compounds from the liquid products to insure sustained operations. The solvent extraction of hydrocarbon materials using supercritical vapor is generally known. For example, the extraction of coal solids material using supercritical vapor solvents is disclosed in U.S. Pat. No. 3,558,468 to Wise, but does not disclose use of supercritical vapor extraction of a catalytically hydroconverted liquid fraction incorporated into a hydroconversion process. Also, the extraction of petroleum residua feedstocks using supercritical vapor extraction procedure before hydroconversion is disclosed in U.S. Pat. No. 4,354,922 to Derbyshire et al and U.S. Pat. No. 4,354,928 to Audeh et al. However, the present invention utilizes in-situ supercritical solvent vapor extraction following catalytic hydroconversion reaction to avoid the undesired precipitation of asphaltenes and provide sustained high hydroconversion operations on heavy hydrocarbon liquid feedstocks, particularly those containing high Ramsbottom carbon residue (RCR) materials and high metals containing compounds.

SUMMARY OF INVENTION

The present invention provides a process for catalytic hydroconversion of heavy hydrocarbon liquid feedstocks such as petroleum residua in which Ramsbottom carbon residue (RCR) materials and metals-containing compounds are removed by on-line supercritical solvent vapor extraction of the reactor effluent liquid fraction. The process comprises feeding a hydrocarbon liquid feedstock together with hydrogen into a reaction zone, which is maintained at 780°–860° F. temperature and 1000–5000 psig hydrogen partial pressure for liquid phase hydroconversion reactions to provide a hydroconverted effluent material containing a mixture of gas and liquid fractions; separating said hydrocarbon effluent material in a first separation zone into a gas fraction and a liquid fraction; passing said liquid fraction to a second separation zone maintained at a temperature above the critical temperature of a solvent vapor added to said liquid in said second separation zone to dissolve and extract substantially all the hydrocarbon liquid fraction from the liquid and provide substantial separation of the RCR material and metals-containing compounds therein; withdrawing said residue along with a minor portion of high boiling residual oil from said second separation zone; withdrawing and pressure-reducing the remaining extracted vapor from said second separation zone containing supercritical solvent vapor and dissolved liquid, and separating a light solvent fraction from a remaining heavy liquid fraction; recycling a portion of the light solvent vapor fraction to said second separation zone to provide a supercritical solvent vapor added therein; and withdrawing hydrocarbon liquid and gas products from the process.

This hydroconversion process can be operated in either of two modes of operation. One mode utilizes a single hydroconversion reaction stage followed by maximum extraction of the liquid fraction and rejection of the high RCR, high metal-containing heavy slurry material, and recycle of part of the heavy oil product to the reaction zone for increased conversion. This mode is useful mainly for high hydroconversion operations on high RCR—high metal containing feedstocks for which there is the usual possibility of operational problems. A second mode uses hydroconversion and moderate extraction of the hydrocarbon liquid fraction in a first separation zone, and recycle of high RCR, high metals-containing heavy slurry material to the reaction zone, and passing the high quality heavy oil on to a catalytic hydrodesulfurization reactor for hydrocracking and conversion to desired lighter hydrocarbon products. Alternatively, at least a portion of the supercritical solvent vapor needed for liquid extraction in the second separation zone can be produced in the first separation zone and drained into the second separation zone and vaporized therein.

This process is useful for hydroconversion of hydrocarbon liquid feedstocks, including petroleum whole crudes, atmospheric residua and vacuum residua materials, bitumen derived from tar sands and shale oil. It is an advantage of the process that the high RCR and metals-containing compounds are effectively removed from the reaction zone hydrocarbon effluent liquid fraction so as to permit achieving high hydroconversion of the feedstocks to produce lower boiling hydrocarbon liquid and gas products.

DESCRIPTION OF INVENTION

Figure 1:
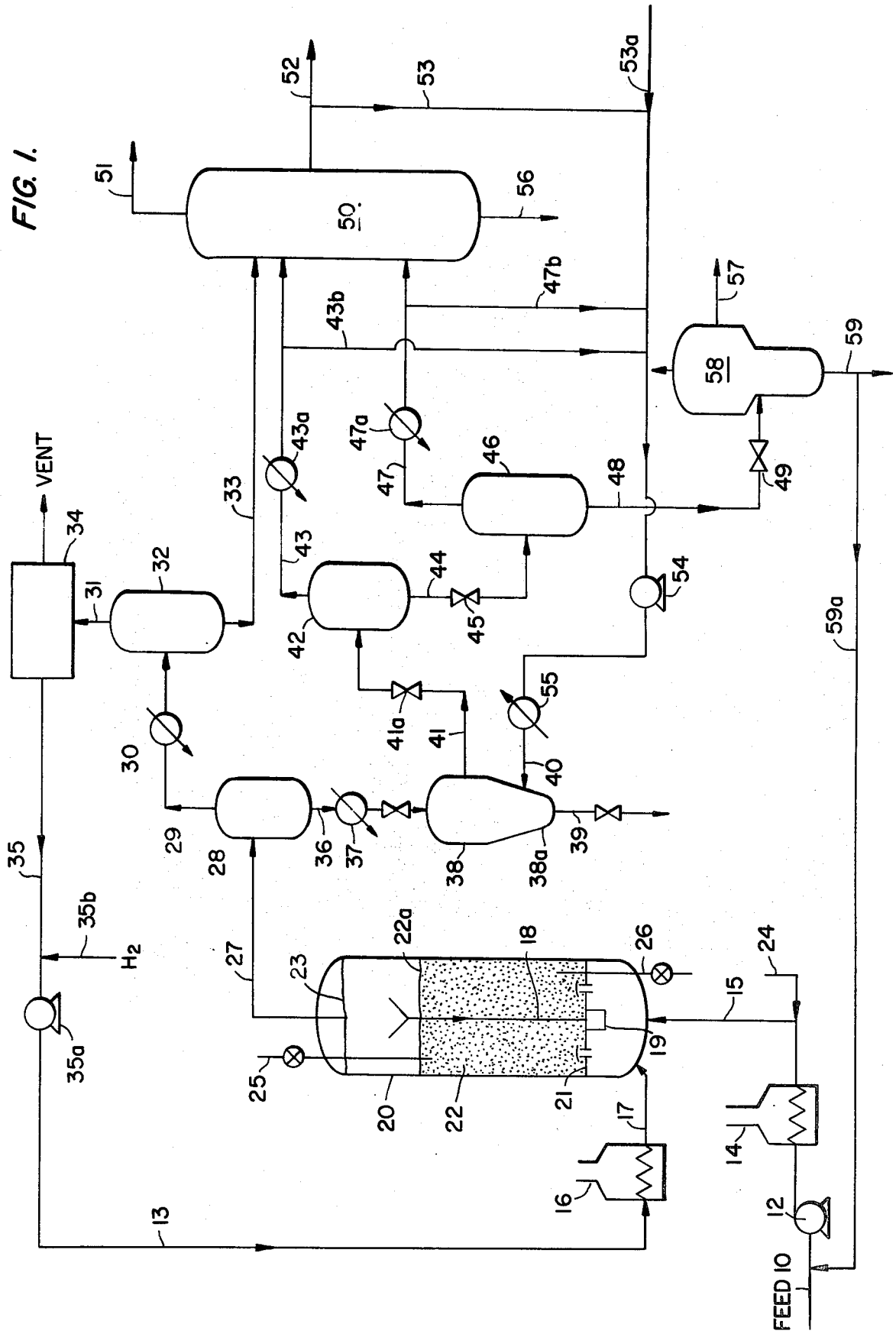
FIG. 1 is a schematic diagram of a hydroconversion process for hydrocarbon liquids using supercritical vapor high extraction of the liquid fraction in accordance with this invention.

In the present invention, a process for hydroconversion of heavy hydrocarbon feedstocks such as petroleum residua using supercritical vapor extraction of a liquid fraction derived from a catalytic hydroconversion of feedstock is described by reference to FIG. 1. As shown, a petroleum residua feedstock such as heavy Arabian vacuum resid or Bachquero vacuum bottoms, is provided at 10, pressurized at 12 and passed through preheater 14 for heating to at least about 500° F. The heated feedstream at 15 is introduced into upflow ebullated bed catalytic reactor 20. Hydrogen at 13 is heated at 16, and also introduced at 17 into reactor 20. The reactor 20 contains at inlet flow distributor and catalyst support grid 21, so that the feed liquid and gas passing upwardly through the reactor 20 will expand the catalyst bed 22 by at least about 10% and usually up to about 50% over its settled height, and place the catalyst in random motion in the liquid. This reactor is typical of that described in U.S. Pat. No. Re. 25,770, wherein a liquid phase reaction occurs in the presence of a reactant gas and a particulate catalyst such that the catalyst bed is expanded.

The catalyst particles in bed 22 usually have a relatively narrow size range for uniform bed expansion under controlled liquid and gas flow conditions. While the useful catalyst size range is between about 6 and 100 mesh (U.S. Sieve Series) with an upflow liquid velocity between about 1.5 and 15 cubic feet per minute per square foot of reactor cross section area, the catalyst size is preferably particles of 6–60 mesh size including extrudates of approximately 0.010–0.130 inch diameter. I also contemplate using a once-through type hydroconversion operation using fine sized catalyst in the 80–270 mesh size range (0.002–0.007 inch) added with the feed, and with a liquid space velocity in the order of 0.1–2.5 volume of fresh feed per hour per volume of reactor ($V_f/hr/V_r$). In the reactor, the density of the catalyst particles, the liquid upward flow rate, and the lifting effect of the upflowing hydrogen gas are important factors in the expansion and operation of the catalyst bed. By control of the catalyst particle size and density and the liquid and gas velocities and taking into account the viscosity of the liquid at the operating conditions, the catalyst bed 22 is expanded to have an upper level or interface in the liquid as indicated at 22a. The catalyst bed expansion should be at least about 10% and seldom more than 100% of the bed settled or static level.

Recycle of reactor liquid from above the solids interface 22a to below the flow distributor grid 21 is usually needed to establish a sufficient upflow liquid velocity to maintain the catalyst in random motion in the liquid and to facilitate an effective reaction. Such liquid recycle is preferably accomplished by the use of a central downcomer conduit 18 which extends to a recycle pump 19 located below the flow distributor 21, to assure a positive and controlled upward movement of the liquid through the catalyst bed 22. The recycle of liquid through internal conduit 18 has some mechanical advantages and tends to reduce the external high pressure piping connections needed in a hydroconversion reactor, however, liquid recycle upwardly through the reactor can be established by a recycle conduit and pump located external to the reactor.

The hydroconversion reaction in bed 22 is greatly facilitated by use of an effective catalyst. The catalysts useful in this invention are typical hydrogenation catalysts containing activation metals selected from the group consisting of cobalt, molybdenum, nickel and tungsten and mixtures thereof, deposited on a support material selected from the group of alumina, silica, and combinations thereof. If a fine-size catalyst is used, it can be effectively introduced to the reactor at connection 24 by being added to the feed in the desired concentration, as in a slurry. Catalyst may also be periodically added directly into the reactor 20 through suitable inlet connection means 25 at a rate between about 0.1 and 2.0 lbs catalyst/barrel feed, and used catalyst is withdrawn through suitable withdrawal means 26.

Operability of the ebullated catalyst bed reactor system to assure good contact and uniform (iso-thermal) temperature therein depends not only on the random motion of the relatively small catalyst in the liquid environment resulting from the buoyant effect of the upflowing liquid and gas, but also requires the proper reaction conditions. With improper reaction conditions insufficient hydroconversion is achieved, which results in a non-uniform distribution of liquid flow and operational upsets, usually resulting in excessive coke deposits on the catalyst. Different feedstocks are found to have more or less asphaltene precursors which tend to aggravate the operability of the reactor system including the recycle pump and piping due to the plating out of tarry deposits. While these deposits can usually be washed off by lighter diluent materials, the catalyst in the reactor bed may become completely coked up and require premature shut down of the process unless undesired precipitation of such asphaltenes materials is avoided.

For the heavy petroleum residua feedstocks of this invention, i.e. those containing about 10–22 W % RCR-containing materials and total metals at least about 0.02 W %, the operating conditions used in the reactor 20 are within the broad ranges of 780°–860° F. temperature, 1000–5000 psig, hydrogen partial pressure, space velocity of 0.1–2.5 $V_f/hr/V_r$ (volume feed per hour per volume of reactor), and a recycle ratio of vacuum bottoms material to feedstock within a range of 0.4–0.7. Preferred conditions are 790°–850° F. temperature, 1200–3000 psig, hydrogen partial pressure, and space velocity of 0.20–1.5 $V_f/hr/V_r$. Usually more preferred conditions are 800°–840° F. temperature and 1250–2800 psig hydrogen partial pressure. The feedstock hydroconversion achieved is at least about 75 V % for once-through single stage type operations and preferably 90–98 V % for single or two-stage reactor operation.

In the catalytic reactor 20, a vapor space 23 exists above the liquid level 22a and an overhead stream containing both liquid and gas fractions is removed at 27, and passed to hot phase separator 28. The resulting gaseous portion 29 is principally hydrogen, which is cooled at heat exchanger 30, and passed to gas/liquid phase separator 32. The resulting gaseous fraction 31 is passed to gas purification step 34. The recovered hydrogen stream at 35 can be rewarmed at heat exchanger 30 and is recycled by compressor 35a reheated at heater 16, and is passed as stream 17 into the bottom of reactor 20, along with make-up hydrogen at 35b as needed. Also from separator 32, a liquid fraction 33 is withdrawn and passed to fractionator 50 as described further herein below.

From the first separator 28, liquid fraction 36 is withdrawn, cooled by 20°–80° F. at heat exchanger 37 and introduced into second separator 38, which is maintained at 750°–780° F. temperature and at a pressure about 50–150 psi below that in separator 28 so as to avoid any appreciable thermal cracking of the liquid. In second separator 38, a supercritical solvent vapor fraction at 40 having a temperature about 15°–50° F. below the liquid temperature existing in the separator is added to the liquid therein to effectively dissolve and highly extract the liquid. A hydrocarbon fraction having normal boiling range of 250°–450° F. provides a good supercritical solvent vapor for extracting the liquid in separator-extractor 38. The weight ratio of the supercritical solvent vapor added to the liquid in separator 38 should be within a range of about 1–5, and preferably is 2-4. The separator 38 will preferably have a smaller diameter at its lower end 38a to facilitate withdrawal of stream 39 therefrom containing substantially all the RCR and metals-containing materials.

The extracted liquid fraction containing the supercritical solvent is removed in substantially vapor form at 41, pressure-reduced at 41a and flashed in flash vessel 42 so as to separate gases and oil vapors from the remaining heavy oil fraction. The pressure in flash vessel 42 should usually be less than about 70% of that in separator 38, and preferably 30-60% of that pressure. From vessel 42, the vapor portion at 43 is usually condensed at cooler 43a and a portion 43b recycled as supercritical solvent vapor to separator 38, and the remainder passed to fractionator 50. Liquid fraction 44 is preferably further pressure-reduced at 45 and passed to second flash vessel 46. Overhead vapor 47 from flash vessel 46 is usually condensed at cooler 47a, and a portion 47b is also recycled as solvent vapor, and the remainder is passed to fractionator 50. Liquid fraction 48 is withdrawn and usually passed to vacuum distillation at 58.

Alternatively, the 250°-450° F. oil fraction needed for the critical solvent vapor for extraction in separator 38 can be separated from the light oil fractions in fractionation tower 50. From fractionator 50, a gas product is removed at 51 and an oil product fraction removed at 52. A portion 53 needed for providing the critical solvent and preferably having normal boiling range of 300°-360° F. can be removed, pressurized at 54, heated at 55 to the desired supercritical temperature and recycled to separator 38 as supercritical vapor stream 40. If needed, some make-up solvent fraction can be added at 53a, such as during process start-up conditions. From separator-extractor 38, the heavy oil material at 39 containing substantially all the RCR and metals-containing compounds is withdrawn for discard. Also, from fractionator 50, bottoms stream 56 is withdrawn as product. From vacuum distillation unit 58, a light hydrocarbon liquid product fraction is removed at 57 and a vacuum bottoms material is withdrawn at 59. A portion 59a of the vacuum bottoms material is preferably recycled to reactor 20 for further conversion to lower boiling hydrocarbon products. The volume ratio of the recycled vacuum bottoms material 59a to feedstream 10 should be between about 0.4 and about 0.7.

Figure 2:
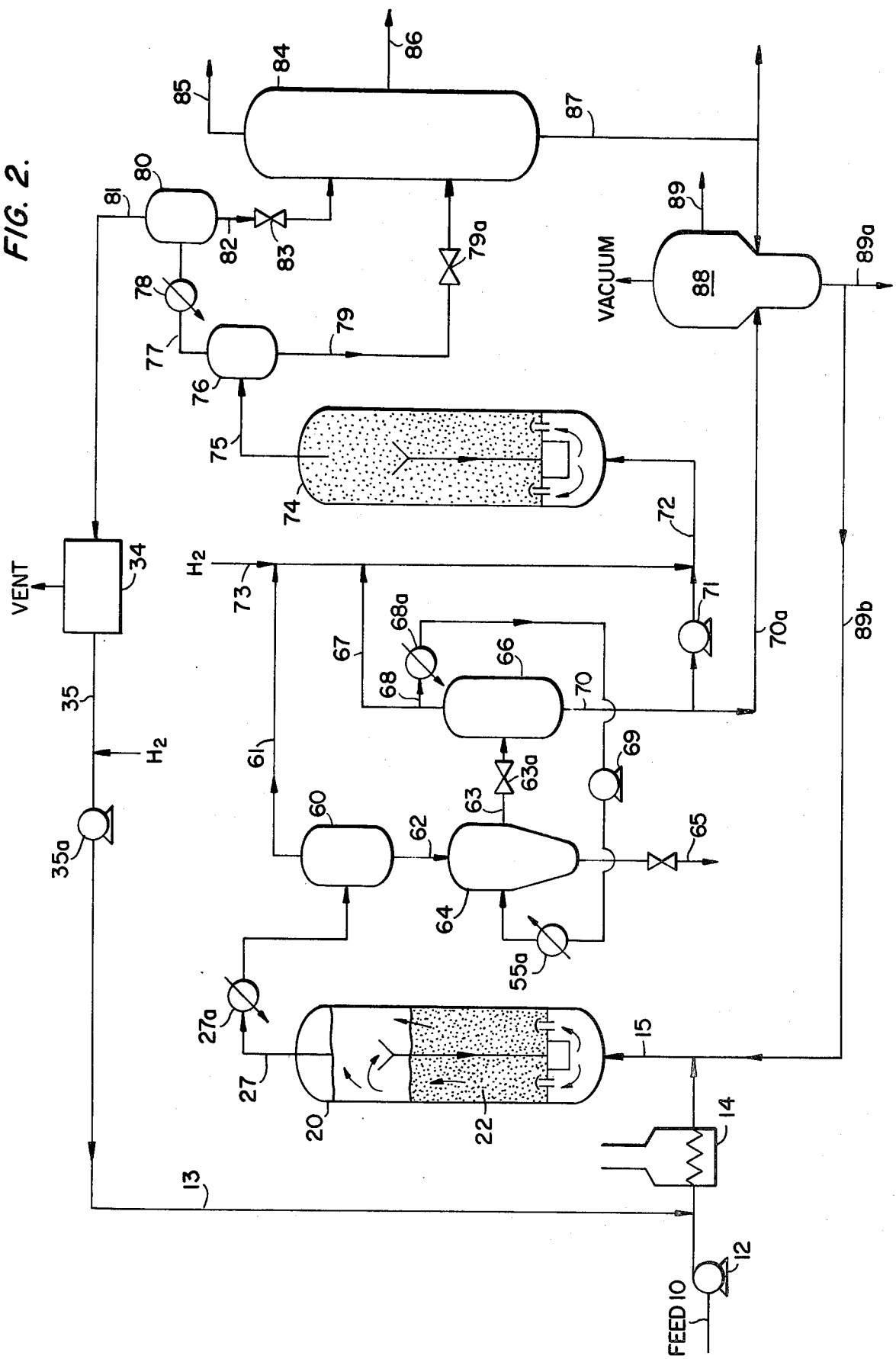
FIG. 2 shows another embodiment of the invention using a two-stage hydroconversion reaction zone and an alternative supercritical vapor high extraction step located between the two stages.

An alternative embodiment of the invention is shown in FIG. 2, in which the supercritical solvent vapor fraction used for extraction is at least partly formed in a first hot separator and drained into a second separator-extractor unit, which is maintained at about 100° F. higher temperature and 200-600 psi lower pressure than the first separator. The increased temperature needed in the second separator is maintained by adding external heat as required.

As shown in FIG. 2, recycled hydrogen stream 13 can be added to the feed upstream of heater 14. Otherwise, reactor 20 is operated similarly as for the FIG. 1 embodiment. Following catalytic hydroconversion reactions on the feedstock in reactor 20 at 780°-840° F. temperature and 1800-3000 psig hydrogen partial pressure and space velocity of 0.4-2.5 $V_f/hr/V_r$, the reactor effluent stream 27 is cooled at cooler 27a and passed into first phase separator 60, which is usually maintained at 650°-700° F. temperature. The separator overhead vapor stream 61 consists mainly of hydrogen and other gases as well as light oil vapors, and is passed with additional hydrogen at 73 to a second stage reactor 74 as described below. Liquid fraction 62 from first separator 60 flows into second separator 64, which is maintained at 1500-2500 psig pressure and 750°-800° F. temperature, usually by using external heating means such as electric heating coils attached to the separator. The liquid fractions having critical temperatures between 650°-800° F. vaporizes in the second separator 64 to provide supercritical solvent vapor therein at the high pressure. This supercritical solvent vapor dissolves and highly extracts most of the liquid material in the second separator, except for a heavy liquid slurry material which contains substantially all the solids, such as nickel- and vanadium-containing compounds, and a substantial part of the high RCR-containing material, which is withdrawn at 65. This heavy slurry material is usually discarded from the process, but if desired, a portion can be recycled to the reactor 20 for further hydroconversion.

The extracted hydrocarbon liquid and supercritical solvent vapor in separator 64 is withdrawn in vapor form at 63 and flashed to lower pressure in flash vessel 66 to separate the oil vapors and dissolved gases from the heavy oil fractions. Vapor fraction 67 is removed from flash vessel 66 and passed to a second catalytic reactor 74. If needed to supplement the supercritical solvent vapor provided within second separator 64, a vapor portion 68 can be condensed at 68a, pressurized at 69, reheated at 55a and recycled to the separator 64 as supercritical solvent vapor for producing further extraction therein.

From the flash step 66, the liquid fraction 70 is withdrawn and repressurized at 71 and introduced as stream 72 along with supplemental hydrogen 73 into second ebullated bed catalytic reactor 74, which is very similar in operation to first stage reactor 20. Suitable reaction conditions in the second stage reactor 74 are 780°-820° F. temperature, 1800-2500 psig hydrogen partial pressure, and 0.4-2.0 $V_f/hr/V_r$ space velocity.

From reactor 74, the effluent is passed to phase separation and fractionation steps and processed similarly as for FIG. 1. Specifically, reactor effluent stream 75 is passed to phase separator 76, from which the resulting vapor fraction 77 is cooled at 78 and passed to phase separator 80, from which vapor portion 81 is passed to hydrogen purification system 34. Also from separator 80, liquid fraction 82 is withdrawn, pressure-reduced at 83 and passed to fractionator 84 along with liquid fraction 79 withdrawn from separator 76.

From fractionator 84, a light hydrocarbon gas product is withdrawn at 85, a middle boiling range distillate liquid product stream at 86, and a bottom liquid product withdrawn at 87. If desired, a portion of the heavy oil 87 from fractionator 84 is passed to vacuum distillation at 88 for further removal of light fractions. Also, from the flash step 66, a portion 70a of the heavy oil fraction 70, can be passed to vacuum distillation at 88. From vacuum distillation step 88, a vacuum gas oil stream is removed at 89, and can be combined with fractionator bottoms liquid stream 87. A vacuum bottoms material is withdrawn at 89a, and a portion 89b can be recycled to reactor 20 for further conversion to lower boiling liquid products.

Thus, the present invention can be advantageously used in a hydrocarbon liquid hydroconversion process having two separate stages of catalytic reaction, wherein the supercritical vapor extraction step is located intermediate the two hydroconversion reaction stages to remove substantially all the metal-containing compounds and a substantial portion of the high boiling RCR containing residua from the first stage effluent before it is passed on to the second stage reactor for further hydroconversion, as shown in FIG. 2. In such a two-stage hydroconversion process, the feed to the second stage reactor is thus substantially free of RCR-containing asphaltenes and metals-containing compounds. This process arrangement improves catalyst life in the second stage reactor and also improves product quality. Selective recycle of heavy oil from vacuum distillation to the first stage reactor can also be used to improve resid hydroconversion and liquid product yields.

Figure 3:
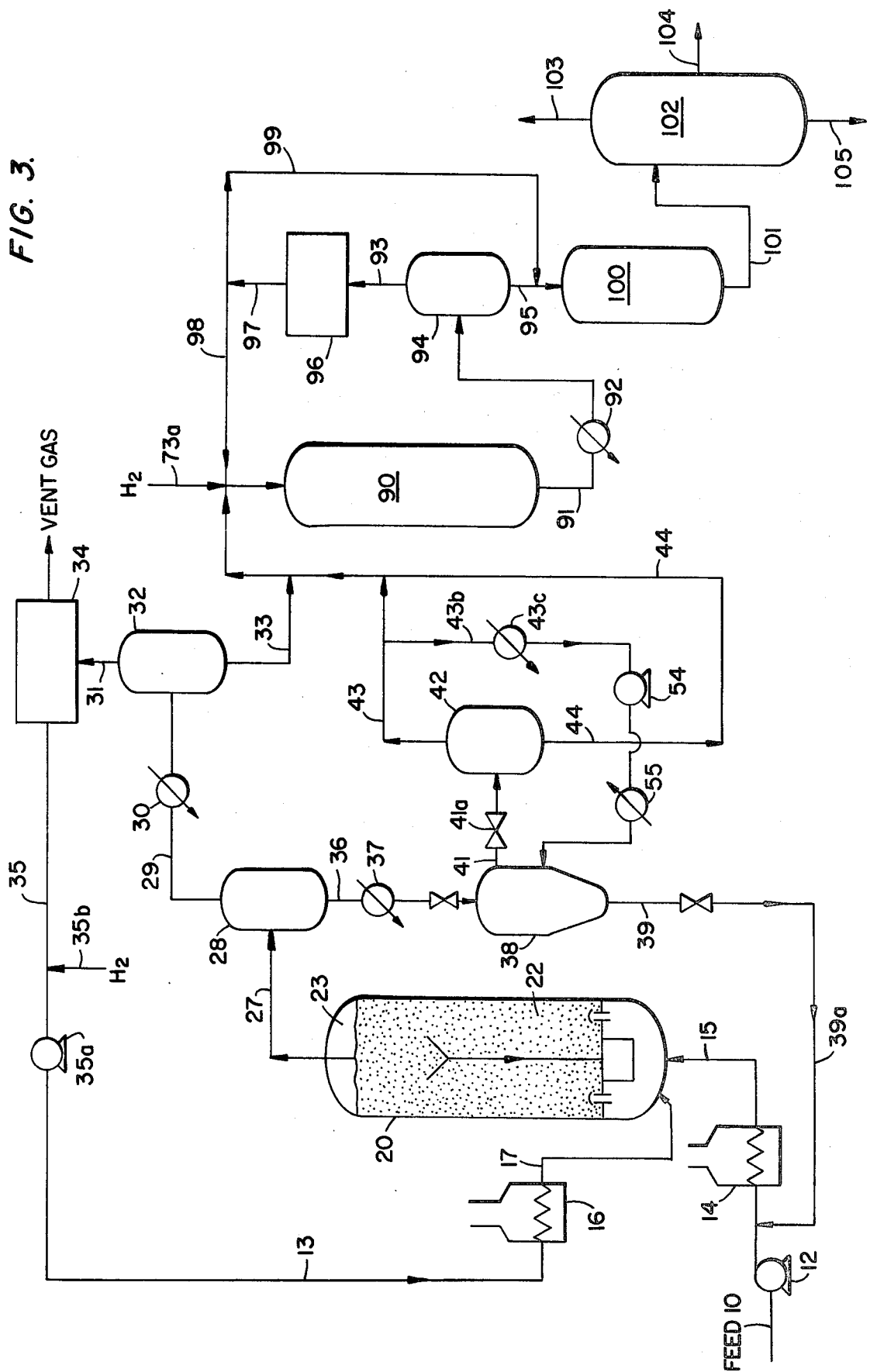
FIG. 3 shows a petroleum hydroconversion process having two stages of catalytic reaction with the supercritical vapor extraction step located intermediate the two reaction stages.

The present invention can also be advantageously used to a two stage reaction process for heavy hydrocarbon liquids in which the second stage is a fixed bed catalytic reactor, as generally shown in FIG. 3. Referring to FIG. 3, the first stage reactor 20 is operated similarly to that for FIG. 1 and may be either catalytic or non-catalytic type. From reactor 20, the reactor effluent material 27 flows into the first separator 28, which is usually maintained at approximately 800°–850° F. temperature and 1500–4000 psig hydrogen partial pressure. From the first separator 28, overhead stream 29 consisting of hydrogen and other light gases and oil vapors is cooled at 30 and passed to the second separator 32. The slurry liquid fraction 36 from the first separator 28 is cooled and flows into the second separator 38, which is maintained at 750°–820° F. temperature and about 1200–3800 psig pressure. The liquid from the first separator usually needs some intermediate cooling at 37 to maintain the second separator 38 at the desired 700°–780° F. temperature, so as to prevent thermal cracking of the liquid therein.

The supercritical solvent vapor extraction of the slurry liquid occurs in second separator 38. A process-derived liquid fraction normally boiling between about 300°–360° F. provides a good supercritical solvent extraction fluid at the preferred 730°–780° F. temperature of the second separator. The supercritical oil vapor fraction along with the extracted material in vapor form is withdrawn at 41, pressure-reduced to separate out vapor fractions, then condensed, pressurized and heated to the desired supercritical temperature to form a supercritical solvent vapor, which is introduced into separator-extractor 38 to dissolve and extract part of the hydrocarbon liquid therein, including part of the 975° F.+ fraction in the second separator. Specifically, this supercritical vapor together with dissolved liquid is removed as vapor stream 41 and flashed at suitable lower pressure conditions at flash vessel 42 to precipitate out heavy oils, including some resid from the oil vapor. The oil vapor portion 43b is cooled and condensed to liquid form at 43c, then pressurized at 54, heated at 55 and recycled to the second separator 38 to provide the supercritical solvent vapor needed for liquid extraction therein. The heavy liquid stream 39 discharged from second separator 38 consists of metals-containing compounds and some remaining 975° F.+ liquid fraction. This heavy oil stream 39a is preferably recycled through heater 14 to reactor 20 for further hydroconversion.

From the flash step 42, the heavy oil fraction 44 along with vapor 43 and liquid stream 33 are passed together with additional hydrogen 73a to a second reactor 90 for further catalytic desulfurization processing to remove sulfur and nitrogen compounds. Reactor 90 is usually a fixed catalyst bed type reactor. The catalyst used in reactor 90 can be any known hydrodesulfurization catalyst such as cobalt-molybdenum on alumina support. The reaction conditions in reactor 90 are maintained at 740°–820° F. temperature and 1500–2800 psi hydrogen partial pressure.

From reactor 90 the effluent 91 is cooled at cooler 92 and passed to phase separator 94, from which the resulting vapor portion 93 is passed to hydrogen purification system 96. Liquid fraction 95 is withdrawn, and passed along with recycled hydrogen 99 from purification system 96 to hydrocracker 100 for cracking of heavy fractions into lighter hydrocarbon fractions. Useful hydrocracking conditions are 780°–820° F. temperature and 1800–2800 psig pressure. From hydrocracker 100, the effluent 101 is passed to fractionator 102, from which hydrocarbon gas products are withdrawn at 103, a middle boiling range distillate product stream at 104, and a bottom liquid product is withdrawn at 105. Because the 975° F.+ fractions are substantially eliminated in the hydrocracking step 100, a vacuum distillation step is usually not required.

If desired, a portion of the heavy oil from flash step 42 can be recycled to the first stage reactor 20 to improve the resid conversion and liquid products yields. Also, a portion of bottoms material withdrawn at 105 can be preferably recycled to the reactor 90 for increased hydroconversion such as to at least about 90 V% and preferably to 92–98 V% to material boiling below 975° F.

An advantage of the intermediate supercritical extraction step for a petroleum hydroconversion process is that very effective RCR and metals removal is accomplished in-situ in the second separator-extractor. Thus, because the feed to the second stage reactor is low in RCR and metals, the catalyst activity and product quality in the second stage reactor is substantially improved.

This invention will be more fully described by the following examples of petroleum hydroconversion operations, which should not be construed as limiting in scope.

EXAMPLE 1

A petroleum residuum feedstock material containing about 20 W% RCR, 0.075 W% total metals is fed together with hydrogen to a catalytic hydroconversion process having an ebullated catalyst bed reactor. The resulting hydrogenated effluent material is passed from the reactor to a phase separator, from which a liquid fraction is withdrawn, cooled and passed to a second separator-extractor. A hydrocarbon solvent vapor fraction at supercritical conditions is added to the liquid in the second separator to dissolve and extract the hydrocarbon liquid fraction therein and to provide effective separation of heavy asphaltenes and metals-containing compounds. The resulting extracted vapor is withdrawn, flashed at lower pressure to recover the desired solvent fraction for recycle to the extraction step, and the resulting liquid fraction withdrawn and distilled to provide desired liquid products.

Results of this supercritical vapor extracion operation are presented in Table 1.

TABLE 1

| Feedstock | Bachaquero Vacuum Bottoms |
|---|---|
| Reaction Conditions | |

TABLE 1-continued

| Feedstock | Bachaquero Vacuum Bottoms |
|---|---|
| Temperature, °F. | 830 |
| Hydrogen Partial Pressure, psig | 2000 |
| Liquid Space Velocity, $V_f/hr/V_r$ | 2.0 |
| Catalyst Age, bbls/lb. | 85 |
| Conversion of 975° F.+ Material, V % | |
| LIQUID EXTRACTION CONDITIONS | |
| Liquid Temperature, °F. | 760 |
| Liquid Pressure, psig | 1800 |
| Solvent Temperature, °F. | 740 |
| Solvent Normal Boiling Range, °F. | 300–400 |
| Weight Ratio Solvent Added to Liquid Fraction | 3:1 |
| Residence Time in Second Separator, Min. | 2 |
| RCR Content of Second Separator Effluent, W % | <2 |
| RCR Content of Second Separator Bottoms, W % | 50 |
| Metals Content of Second Separator Effluent, ppm | <50 |
| Metals Content of Second Separator Bottoms, ppm | 3000 |

Based on the above results, it is noted that substantial removal of RCR and metals-containing compounds occurs following extraction with the supercritical vapor in the second separator, so that the vapor effluent stream leaving the separator contains less than about 2 W % RCR material and less than 50 ppm metals content. The separator bottoms streams contains substantially all the RCR and metals in the reactor effluent stream.

EXAMPLE 2

A petroleum vacuum residuum material containing about 20 W % RCR material and 0.075 W % total metals is fed together with hydrogen into the first stage ebullated catalyst bed reactor of a two-stage catalytic hydroconversion process. The resulting hydrogenated effluent material is passed from the reactor to a hot phase separator, from which a liquid fraction is withdrawn, cooled and passed to a second separator-extracter. A hydrocarbon solvent vapor fraction at supercritical conditions is added to the liquid in the second separator to dissolve and extract the hydrocarbon liquid fraction therein and to allow the separation of heavy asphaltenes and metals-containing compounds. The resulting extracted vapor is withdrawn, flashed at lower pressure to recover the desired solvent fraction for recycle to the extraction step. The resulting liquid fraction is withdrawn and combined with the vapor fraction from the hot separator and passed to a second catalytic reactor for further hydroconversion reactions followed by phase separation and distillation steps.

Results of this supercritical extraction operations are provided in Table 2.

TABLE 2

| Feedstock | Bachaquero Vacuum Bottoms |
|---|---|
| First Stage Reaction Conditions | |
| Temperature, °F. | 830 |
| Hydrogen Partial Pressure, psig | 2000 |
| Liquid Space Velocity, $V_f/hr/V_r$ | 2.0 |
| Catalyst Age, bbls/lb. | 4.0 |
| LIQUID EXTRACTION CONDITIONS | |
| Liquid Temperature, °F. | 760 |
| Liquid Pressure, psig | 1800 |
| Solvent Temperature, °F. | 740 |

TABLE 2-continued

| Feedstock | Bachaquero Vacuum Bottoms |
|---|---|
| Solvent Normal Boiling Range, °F. | 300–400 |
| Weight Ratio Solvent Added to Liquid Fraction | 2:1 |
| Residence Time in Second Separator, Min. | 2 |
| RCR Content of Second Separator Effluent, W % | <8 |
| RCR Content of Second Separator Bottoms, W % | 35 |
| Metals Content of Second Separator Effluent, ppm | 80 |
| Metals Content of Second Separator Bottoms, ppm | 2000 |
| Second Stage Reaction Conditions | |
| Temperature, °F. | 800 |
| Hydrogen Partial Pressure, psig | 1800 |
| Liquid Space Velocity, $V_f/hr/V_r$ | 2.5 |
| Catalyst Age, bbls/lb. | 1.5 |
| Conversion of 975° F.+ Material, V % | 97 |

Based on the above results, it is noted that substantial removal of RCR and metals-containing compounds occurs in the second separator, so that the vapor effluent stream leaving the separator contains less than about 8.0 W % RCR materials less than about 80 ppm metals. The separator bottoms streams contains substantially all the RCR and metals in the reactor effluent stream.

Although this invention has been described broadly and in terms of certain preferred embodiments, it will be understood that modifications and variations to the process can be made within the spirit and scope of the invention, which is defined by the following claims.

I claim:

1. A process for high hydroconversion of heavy hydrocarbon liquid feedstock containing at least about 50 V % material normally boiling above about 975° F. to produce lower boiling hydrocarbon liquid and gas products wherein Ramsbottom carbon residue (RCR) materials and metals-containing compounds are removed from the liquid fraction by supercritical solvent vapor extraction, said process comprising:

(a) feeding said hydrocarbon liquid feedstock together with hydrogen into a reaction zone, said reaction zone being maintained at 780°–860° F. temperature and 1000–5000 psig hydrogen partial pressure for liquid phase hydroconversion reaction to provide a hydroconverted effluent material containing a mixture of gas and liquid fractions;

(b) separating said hydrocarbon effluent material in a first separation zone into a gas fraction and a liquid fraction;

(c) draining said liquid fraction to a second separation zone maintained at a temperature 50°–150° F. above that in the first separation zone so as to vaporize a solvent fraction and form a supercritical solvent vapor therein to dissolve and extract the hydrocarbon liquid fraction from the liquid to provide substantial separation of the RCR material and metals-containing compound residue from a remaining extracted vapor therein;

(d) withdrawing said residue along with a minor portion of high boiling residual oil from said second separation zone;

(e) withdrawing and pressure-reducing the remaining extracted vapor from said second separation zone containing supercritical solvent vapor and dissolved liquid, and separating a light solvent fraction from a remaining heavy liquid fraction; and (f) withdrawing hydrocarbon liquid and gas products from the process.

2. The process of claim 1, wherein said reaction zone contains an ebullated bed of catalyst.

3. The process of claim 1, wherein the hydrocarbon liquid feedstock is a petroleum residua material.

4. The process of claim 1, wherein a portion of said light solvent fraction is heated to supercritical temperature and recycled to said second separation zone to supplement the solvent vapor therein.

5. The process of claim 1, wherein a light liquid fraction and a heavy oil fraction from said separation zones are passed with hydrogen to a second catalytic reaction zone for further hydroconversion to provide increased yield of low-boiling hydrocarbon liquid and gas products.

6. A process for high hydroconversion of a petroleum residua feedstock containing at least about 50 V % material normally boiling above about 975° F. to produce lower boiling hydrocarbon liquid and gas products wherein Ramsbottom carbon residue (RCR) materials and metals-containing compounds are separated and removed from the liquid product by supercritical solvent extraction, said process comprising:

(a) feeding said petroleum residua feedstock together with hydrogen into a reaction zone containing a catalyst bed, said reaction zone being maintained at 780°–860° F. temperature and 1000–5000 psig hydrogen partial pressure for liquid phase hydroconversion reaction to provide a hydroconverted effluent material containing a mixture of gas and liquid fractions;

(b) separating said hydrocarbon effluent material in a first separation zone into a gas fraction and a liquid fraction;

(c) draining said liquid fraction from said first separation zone into a second separation zone maintained at a temperature 50°–150° F. above that in the first separation zone so as to vaporize a 250°–450° F. boiling range solvent fraction and form a supercritical solvent vapor therein to dissolve and extract substantially all the hydrocarbon liquid fraction from the liquid to provide substantial separation of the RCR material and metals-containing compound residue from a remaining extracted vapor therein;

(d) withdrawing said residue along with a minor portion of high boiling residual oil from said second separation zone;

(e) withdrawing and pressure-reducing the remaining extracted vapor from said second separation zone containing supercritical solvent vapor and dissolved liquid, and separating a light solvent fraction from a remaining heavy liquid fraction;

(f) heating a portion of said light solvent fractionn and recycling it to said second separation zone to supplement the critical solvent vapor therein; and (g) withdrawing hydrocarbon liquid and gas product from the process.

7. A process for high hydroconversion of a petroleum residua feedstock containing at least about 50 V % material normally boiling above about 975° F. to produce lower boiling hydrocarbon liquid and gas products wherein Ramsbottom carbon residue (RCR) materials and metals-containing compounds are separated and removed from the liquid product by supercritical solvent extraction, said process comprising:

(a) feeding said petroleum residua feedstock together with hydrogen into a reaction zone containing a catalyst bed, said reaction zone being maintained at 780°–860° F. temperature and 1000–5000 psig hydrogen partial pressure for liquid phase hydroconversin reaction to provide a hydroconverted effluent material containing a mixture of gas and liquid fractions;

(b) separating said hydrocarbon effluent material in a first separation zone into a gas fraction and a liquid fraction;

(c) draining said liquid fraction from said first separation zone into a second separation zone maintained at a temperature 15°–50° F. above that in the first separation zoner so as to vaporize a fraction having a normal boiling range of 250°–450° F. and forming a supercritical solvent vapor in the second separation zone for dissolving and extracting the hydrocarbon liquid fraction therein to provide substantial separation of the RCR materials and metals-containing compound residue from a remaining extracted vapor therein;

(d) withdrawing said residue along with a minor portion of high boiling residual oil from said second separation zone;

(e) withdrawing and pressure-reducing the remaining extracted vapor from said second separation zone containing the supercritical solvent vapor and dissolved liquid, and separating a light solvent fraction from a remaining heavy liquid fraction;

(f) combining said gas fraction and the remaining portion of said heavy liquid fraction and introducing the combined stream along with hydrogen into a second ebullated bed catalytic reaction zone maintained at 700°–820° F. temperature and 1000–4500 psig hydrogen partial pressure for further hydroconversion and desulfurization to provide a hydrocarbon effluent material containing liquid and gas fractions;

(g) separating said hydrocarbon effluent material in a third separation zone into a gas fraction and a liquid fraction; and (h) withdrawing hydrocarbon liquid and gas products from the process.

* * * * *